United States Patent [19]

Wainer

[11] 4,014,981

[45] Mar. 29, 1977

[54] REMOVAL OF SULFUR FROM STACK GASES

[75] Inventor: Eugene Wainer, Shaker Heights, Ohio

[73] Assignee: Horizons Incorporated, a division of Horizons Research Incorporated, Cleveland, Ohio

[22] Filed: May 21, 1973

[21] Appl. No.: 362,013

[52] U.S. Cl. .................................. 423/506; 55/17; 55/68; 55/73; 423/244; 423/522; 423/551
[51] Int. Cl.² .................. B01D 57/00; C01B 17/00
[58] Field of Search .......... 55/17, 52, 73; 423/242, 423/244, 506, 532

[56] References Cited

UNITED STATES PATENTS

| 2,445,117 | 7/1948 | Her ..................................... 423/506 |
| 3,273,325 | 9/1966 | Gerhold .................................. 55/17 |
| 3,607,034 | 4/1967 | Henery et al. ....................... 423/522 |
| 3,747,306 | 7/1973 | Wikdahl ................................ 55/17 |

Primary Examiner—O. R. Vertiz
Assistant Examiner—Gary P. Straub
Attorney, Agent, or Firm—Lawrence I. Field

[57] ABSTRACT

Combustion products, especially those from electric power generating installations burning high sulfur fuels are treated to remove solids and then to separate physically sulfur containing constituents, such as $SO_2$ and/or $SO_3$ from other gases in the combustion products mixture by means of an ultra high speed gas centrifuge or a gas cyclone. The recovered oxides of sulfur in a heated condition are utilized in any desired chemical reaction. For example, they may be passed over dry NaCl and reacted therewith to yield sodium sulfate and chlorine, both of which can be recovered, and/or they may be passed directly over suitable catalysts in the presence of air to produce a pure grade of sulfur trioxide which can be absorbed in water to manufacture concentrated sulfuric acid.

10 Claims, No Drawings

REMOVAL OF SULFUR FROM STACK GASES

This invention relates to the diminution of pollution from electric power generating installations or other industrial facilities in which high sulfur fuels are burned whereby gaseous products of combustion are produced with higher contents of sulfur oxides than are desirable for discharge into the atmosphere.

More particularly, the invention relates to a process in which the hot products of combustion are treated by physical means to separate effectively the sulfur oxides from the remaining constituents, both solid gaseous, and the subsequent recovery of such sulfur oxides in a chemical process while they retain the heat produced as the result of the combustion process.

A principal object of the present invention is to diminish environmental pollution resulting from the burning of high sulfur fuels in industrial installations, such as electric power generating plants, or in factories, or furnaces.

A further object of the present invention is to utilize the enriched sulfur containing gases while still hot in a variety of chemical processes, which economically become much more attractive because of the heat content of the recovered gas.

Still another object of the present invention is to make it possible to collect certain non-sulfur containing gases from the stack gases in relatively pure form for utilization of these non-sulfur containing constituents as items of commerce, thereby adding further to the economical attractiveness of the process.

These and other objects will be pointed out or will be made apparent in the description which follows in which preferred embodiments of the invention are described.

The molecular weights of gases normally found as a consequence of combustion of coal, for example, is given in Table 1. Also, given in Table 1 is the usual range of percentage of the various gases which are obtained from the combustion of sulfur containing coals, for example. These percentages are indicative of the proportions generally found and obviously will vary widely not only with the nature of the coal or other fuel used for combustion purposes, but also with the manner in which the combustion process itself is carried out. For example, some coals are high enough in sulfur so that the amount of sulfur containing gases in the stack gas may actually be higher than 5 percent. If the combustion is properly carried out, little or no carbon monoxide will be found in the stack gas. Thus, outside of the sulfur containing gases the principal constituents are a major amount of carbon dioxide with a minor amount of nitrogen and air.

Table 1

MOLECULAR WEIGHTS OF STACK GASES
AND PERCENT IN STACK GAS

| GAS | MOLECULAR WEIGHT | PERCENT IN STACK GAS |
| --- | --- | --- |
| $SO_3$ | 80 | 01. to 5.0% |
| $SO_2$ | 64 | |
| $CO_2$ | 44 | 60 to 80% |
| CO | 28 | 0 to 5% |
| $N_2$ | 28 | 18 to 35% |

Table 1-continued

MOLECULAR WEIGHTS OF STACK GASES
AND PERCENT IN STACK GAS

| GAS | MOLECULAR WEIGHT | PERCENT IN STACK GAS |
| --- | --- | --- |
| Air | 29 | |

In the products of combustion of sulfur containing fuels, and considering only with the oxides of sulfur, generally the sulfur dioxide content is by far the major constituents of these sulfur oxides, with the sulfur trioxide being a minor constituent and in some cases being completely absent.

The removal of sulfur oxides from combustion gases has been accomplished in the past by a wide variety of techniques. One of the most studied of these involves absorption of the oxides of sulfur in a basic material, such as a slurry of milk of lime, or magnesium oxide. For economical operation, the base must be recovered and recycled and as a result, sulfur containing gases are released and must be utilized in a manner which avoids pollution of the environment, i.e., pollution of the atmosphere, or of ponds, rivers or other bodies of water, or of the land.

Other processes in which the sulfur oxides are absorbed physically in a porous material also require reuse of the absorbent in order to be commercially attractive.

Both of these procedures usually require heat in order to release the oxides of sulfur for economical collection purposes and recycle of the base or the absorbent. Supplying this extra heat adds further to the problem of ecological disturbance.

The present invention avoids the disadvantages inherent in such prior art approaches and consists briefly of the following:

First, the hot products of combustion are subjected to a solids removal treatment, whereby fly ash and other solid particles are separated from the hot gases. Such treatments are known and include electrostatic precipitation, cyclone separators, baffles, and other known devices whereby the solids are physically separated from the gases without any substantial cooling of the hot gases.

Then the hot gases are passed into an ultra high speed gas centrifuge and are substantially quantitatively separated into lighter and heavier gases. The oxides of sulfur, being substantially heavier than the carbon dioxide, oxygen, nitrogen and carbon monoxide are separated as a substantially pure fraction and may be utilized in the same manner as hot sulfur oxides produced from the burning of elemental sulfur, for example.

The ultra high speed gas centrifuge, well known in the art, generally consists of a specially designed spindle operating at extremely high speeds inside a stationary housing. In order to obtain the most efficient use of such a device, generally the spindle is rotated at a speed just below the point at which the centrifugal force imposed will be sufficient to cause the spindle to fly apart. An alternate device involving no moving parts may also be utilized for the purposes of obtaining a reasonably quantitative separation of the sulfur containing gases from the remaining gases in the fuel gas mixture. This is a gas cyclone through which the gases are passed at an extremely high rate of speed. This device is not as efficient as the ultra high speed gas centrifuge but the desired levels of separation are obtained by using multiples of these units in tandem with separation slots available so that this collection of multiple units operate in a fashion for obtaining the desired purity.

The manner in which gas separation and purification is accomplished is depicted as follows:

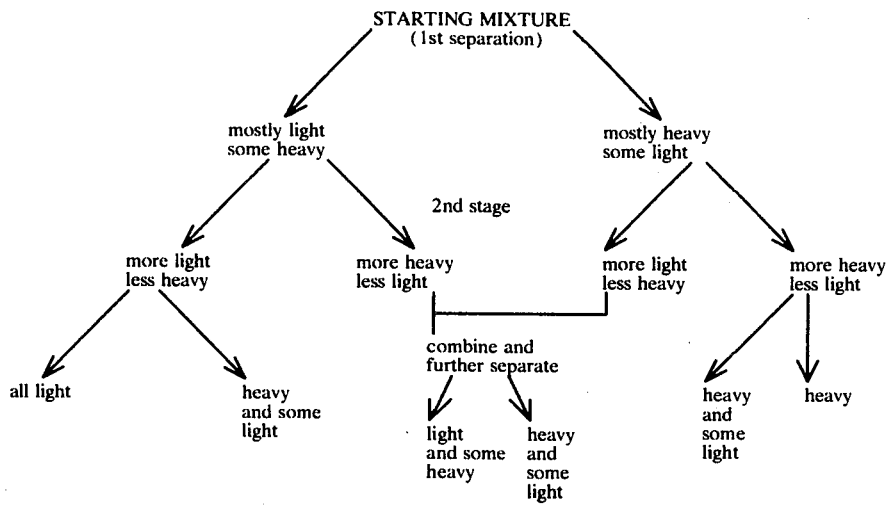

By utilizng a sufficient number of stages, a relatively pure heavy fraction containing all of the sulfur oxides is recovered separately from the lighter nitrogen and carbon oxides.

If desired, any of the constituents in the nitrogen-carbon oxide mixture may be further recovered and sold, for example, the carbon dioxide can be recovered and sold as dry ice. In the production of dry ice from this fraction, the presence of nitrogen, oxygen and air does not interfere with the refrigeration of the mixture for the production of the dry ice product since all of the constituents of air, namely nitrogen and oxygen, remain as gases in this process and may be vented to the air without fear of pollution of the atmosphere.

In one manner of utilizing the recovered sulfur oxides, the hot mixture of $SO_2$ and $SO_3$ while still hot is mixed with air and passed over dry NaCl, thereby producing chlorine and salt cake as follows:

$$2[O] + SO_2 + 2NaCl \rightarrow Cl_2 + Na_2SO_4$$

and $$[O] + SO_3 + 2NaCl \rightarrow Cl_2 + Na_2SO_4$$

The chlorine may be used as such in gaseous or liquid form, or may be converted to HCl, in known manner.

In a further utilization, the hot mixture of $SO_2$ and $SO_3$ while still hot, is mixed with air and passed over a catalyst in known manner, thereby producing $SO_3$, which is then absorbed in water to yield concentrated sulfuric acid.

Depending on location of the unit producing the sulfur containing combustion gases, economical manufacture of sulfuric acid as a consequence of such location is often attractive by virtue of reduction or elimination of freight costs which make this normally low cost commodity more expensive than necessary. In the case of gases containing relatively small percentages of sulfur dioxide, such as is normally encountered in stack gases burning high sulfur fuels, it is economically unattractive to attempt to convert these stack gases into the needed sulfur trioxide, which is then absorbed in water in order to produce concentrated sulfuric acid, unless the concentration of the sulfur trioxide in these stack gases is at least 10 percent and preferably about 20 percent. This level of concentration is substantially never available in the combustion of the usual fuels which are utilized primarily for the production of heat and power.

Having described my invention in accordance with the Patent Statutes, it is not intended that they be limited except as may be required by the appended claims.

I claim:

1. A process for diminishing environmental pollution resulting from the burning of sulfur containing fuels which comprises:

burning said sulfur containing fuels thereby producing hot products of combustion containing oxides of sulfur and carbon;

separating said oxides of sulfur from said hot combustion products before they cool to any appreciable extent and while they are still at an elevated temperature, by purely physical means in which the hot combustion products are subjected to centrifugal force;

and recovering the hot sulfur oxides before they have cooled to any appreciable extent.

2. The process of claim 1 wherein the physical means is an ultra centrifuge.

3. The process of claim 1 wherein the physical means includes at least one gas cyclone separator.

4. The process of claim 3 wherein the physical means is a series of gas cyclone separations.

5. The process of claim 1 wherein the oxides of sulfur include at least one oxide of sulfur selected from the group consisting of $SO_2$ and $SO_3$.

6. The process of claim 1 including in addition the step of separating solids contained in said hot products of combustion prior to separating said oxides of sulfur from said hot products of combustion by purely physical means without appreciably cooling said hot products of combustion.

7. The process of claim 6 wherein said solids include fly ash.

8. The process of claim 1 wherein said hot oxides of sulfur are utilized by passing air and said oxides of sulfur over NaCl while said oxides of sulfur still retain the heat of combustion, thereby producing sodium sulfate and chlorine gas and separately recovering said chlorine gas and said sodium sulfate.

9. The process of claim 1 wherein the sulfur values in the products of combustion are recovered by converting the same to sulfuric acid.

10. The process of claim 1 including in addition the recovery of said oxides of carbon.

* * * * *